United States Patent Office 2,818,461
Patented Dec. 31, 1957

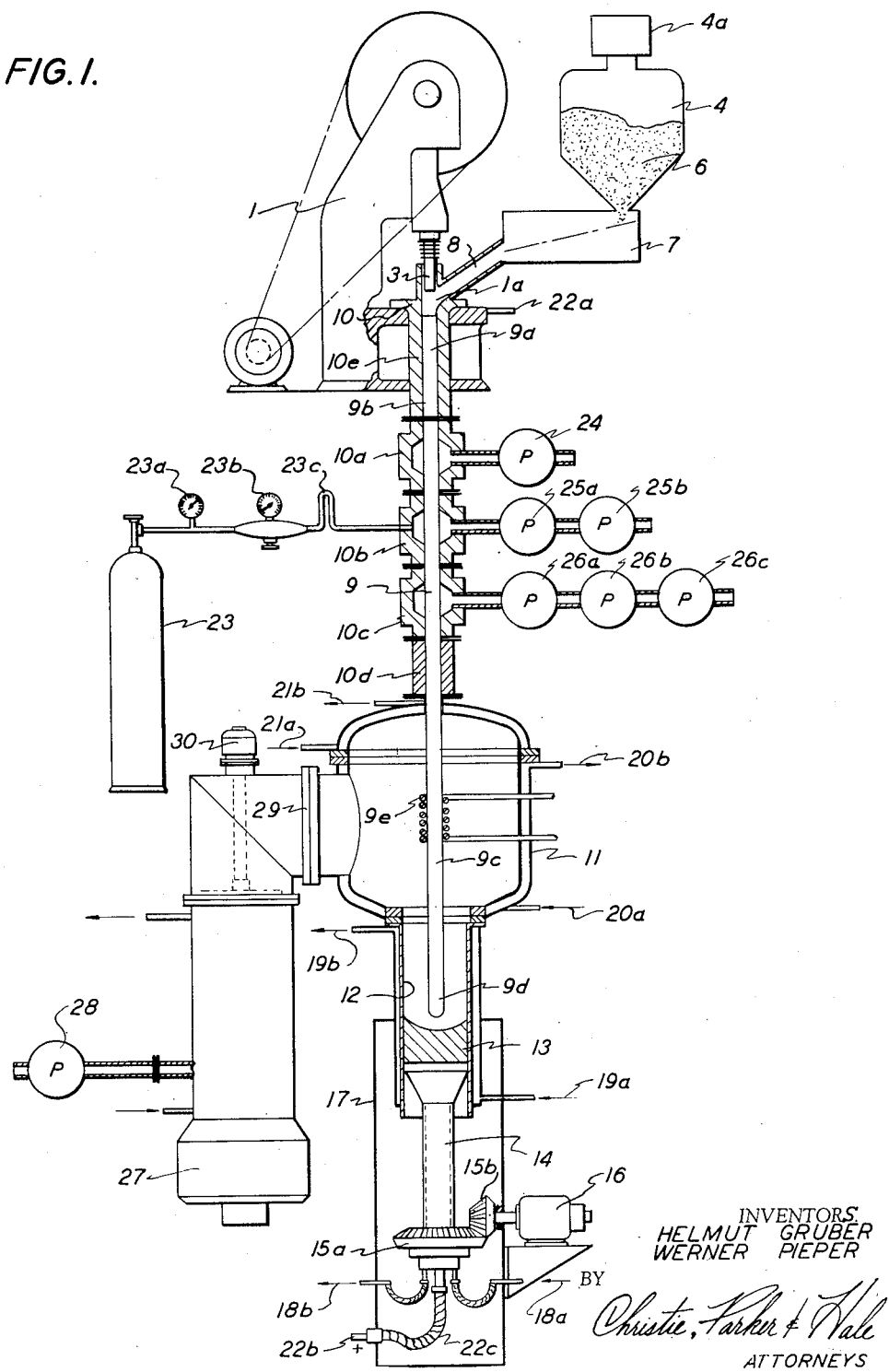

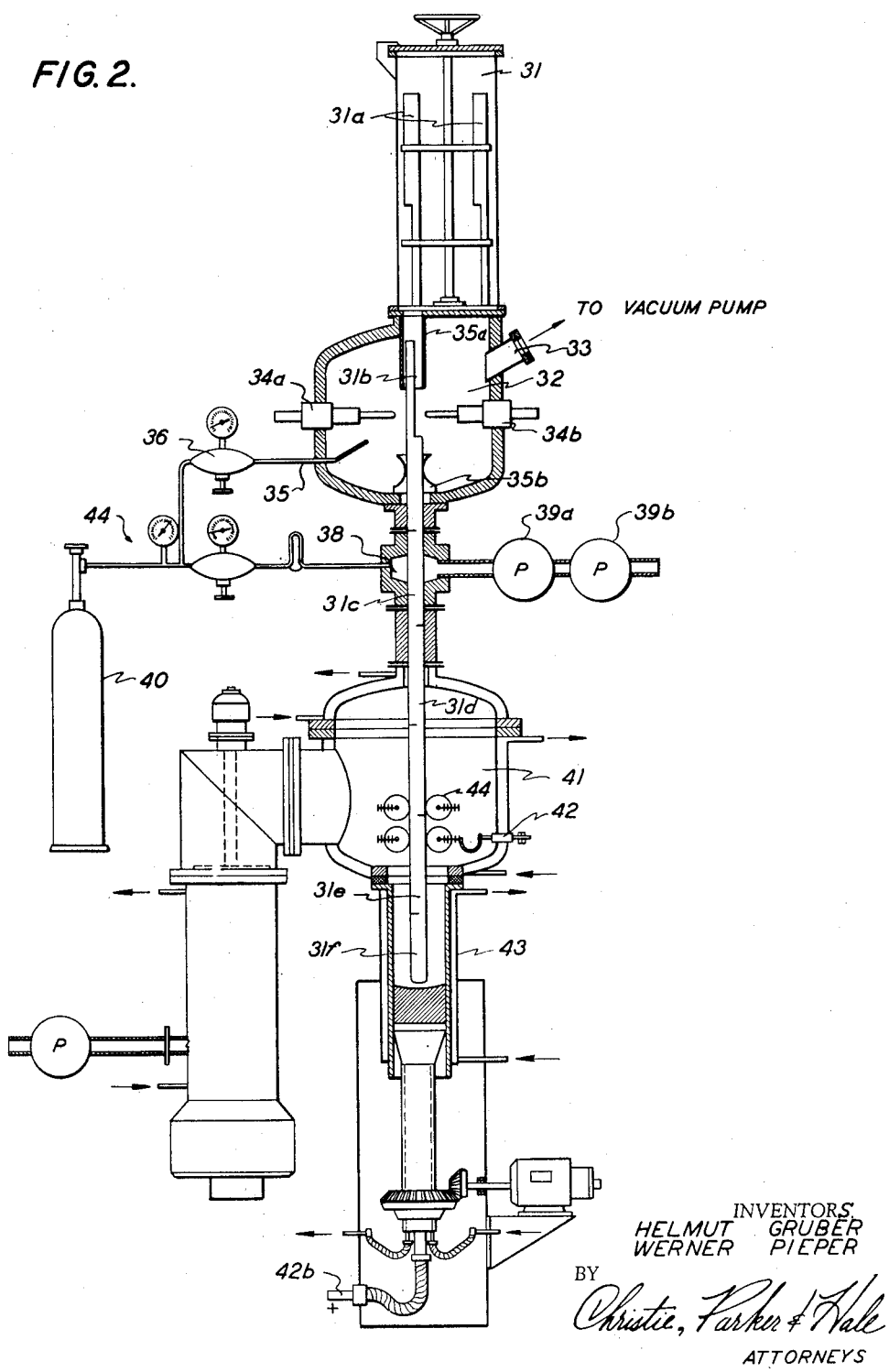

2,818,461

ARC-MELTING FURNACE FOR HIGH-MELTING METALS

Helmut Gruber and Werner Pieper, Hanau (Main), Germany, assignors to W. C. Heraeus G. m. b. H., Hanau (Main), Germany, a German body corporate Application February 16, 1955, Serial No. 488,555

Claims priority, application Germany February 22, 1954

4 Claims. (Cl. 13—31)

The present invention relates to high-melting-metals and alloys of such metals, more particularly to high-melting metals of the branch rows of the 4th to 6th groups (or in other words of the 2nd, 3rd and 4th columns of the transition series) of the periodic system of the elements and has amongst its objects to provide an improved method for melting such metals in a vacuum by means of an electric arc, and to provide improved electric-arc melting apparatus for the execution of the method. The metals in question are more particularly titanium, zirconium, molybdenum, hafnium, vanadium, niobium, tantalum, chromium, and tungsten.

In connection with metals of this character, which only will melt at very high temperatures, melting by heating in an electric arc and in water-cooled metal crucibles has gained in recent years progressively increasing importance, because these metals react very intensely with non-inert gases such as nitrogen, oxygen and hydrogen. It is therefore necessary for the melting to be carried out under reduced pressure in a vacuum or in inert gases (protective gases) of any desired pressure, more particularly of 10 to 100 mm. Hg.

The melting by means of an electric arc on the other hand creates in its turn novel problems; for the metals in question contain in their raw condition great quantities of gas in a dissolved or occluded form or absorbed in their surface, these quantities being liable to be released upon heating in an electric arc, and forming the principal cause of the difficulties which it is the object of the present invention to overcome.

The present invention has now been developed from a consideration of the problem of excluding altogether contamination of the metal melt not only by crucible material but also by contaminations by electrode material. The method of the invention is therefore more particularly concerned with electric-arc melting with the use of self-consuming fuse-off electrodes made of the same metal as that to be smelted. The fuse-off electrode is in this process progressively fed to the electric-arc melting zone in a manner similar for example to that in which in automatic welding apparatus welding wire is progressively fed to the arc. The use of fuse-off electrodes thus prevents contamination by electrodes of a composition different from that of the metal to be smelted, for example by electrodes of tungsten and graphite. This method should be conducted in such a manner that a high melting speed can be attained.

The method of the invention furthermore complies with the requirement that the quantities of gas which hitherto were set free during melting, and which cause splashing and are liable to interfere considerably with the operation of electric-arc apparatus, are eliminated at least immediately before, in such manner that they no longer disadvantageously affect the melting. More particularly the method is intended to provide powerful degasification so that substantially greater quantities of gas can be eliminated than can be eliminated for example, by gettering.

The method of the invention is further intended to prevent expelled quantities of gas from combining again in any form with the melted and solidifying metal, and from thereby reducing its quality.

It was however also required according to the invention that the degasification should be so conducted that the metallic starting material reaches the melting zone without again getting into contact with the external air, thus excluding any absorption of gas in the meantime.

By complying with these requirements the method of the invention succeeds in smelting blocks of metal which are distinguished by a surprisingly high degree of purity and ductility and of ready machinability. Since the action of oxygen and nitrogen is prevented, they are no longer as brittle as one had hitherto to put up with.

The invention furthermore also relates to apparatus which permit the method to be carried out. It more particularly provides important improvements and novel features in the manufacture of the self-consuming fuse-down electrodes and in the feeding of the electrodes. It is intended to permit as continuous as possible a manufacture and feed. It aims at simplification of the construction of the feeding mechanism, in order to save complicated lock mechanisms for the introduction of the electrodes into the electric-arc zone.

But the invention is also important for apparatus which do not provide for entirely continuous production of the electrodes, because it brings about in any case a simplification of the joining together of the electrodes, so that in the case of large electrode pieces it can work entirely continuously, although in this case the electrode pieces must be welded together in inert gases of at least 5 mm. In this case it is possible by means of the invention to make and feed fully continuously even electrodes which are required for the producing of smelted blocks having a weight of above 100 kilograms (about 2 cwts.) without it being necessary for electrodes of great weight and great length to be manipulated.

In principle the present invention proposes to effect the predegasification of the metals under a reduced air pressure in such manner that one succeeds in effecting the melting-off in the arc without further contact with noxious gases of a pressure comparable with that of the outer air, which might lead to the absorption or occlusion of appreciable quantities of gas. The features of the process and apparatus which are required for permitting the metal blocks to solidify and for the removal from the arc are basically of known character.

Important features of the method according to the invention for the melting of metals and alloys of the metals of the branch rows of the 4th to 6th groups (metals of the 2nd to 4th column of the transition series) of the periodic system, which have a high melting point by means of an electric arc under a vacuum comprise the continuous formation of firm rod-shaped electrodes of coherent metallic starting materials of the metal to be smelted, the degasification of the electrodes outside the arc zone, the progressive displacement of the electrode towards the arc zone through a dynamic pressure-stage stretch in which the gas pressure which decreases in steps and which includes at least one pressure-stage chamber, the maintenance in the arc zone of a vacuum pressure adequate for the formation of an arc, and the production of an electric arc between the self-consuming fuse-off electrode and the support or the crucible which is intended to accommodate the metal melt and in which the metal block is then caused to solidify.

For the understanding of this and of further steps, the invention will now be described with reference to the accompanying drawings:

Fig. 1 shows an electric-arc melting apparatus for the execution of the method of the invention. The apparatus is provided with a device for the direct production of the electrode from pulverulent to granular starting material, this device including a pressure-stage stretch having three pressure-stage chambers. The arc-melting device according to Fig. 2 is arranged for the welding together of prefabricated electrode part elements. Its pressure-stage stretch contains, only one further pressure-stage chamber in addition to the welding chamber.

Accordingly the apparatus for the process according to the invention comprises a device for the formation of firmly coherent electrode, a vacuum-tight chamber adapted to be evacuated, in which an electric arc can be maintained, devices for the progressive feeding of the electrode formed of the metal to be smelted, electric means for the supply and for controlling the intensity of the electric current, and as a special feature a tubular transfer passage for the electrode, which passage comprises at least one intermediate chamber adapted to be evacuated in order to permit a pressure decreasing in stages to be maintained from the formation zone to the melting-off zone of the electrode, and furthermore means for producing and maintaining pressures lower than atmospheric pressure in the various chambers and means for cooling the parts of the apparatus.

One may for example, as assumed in Fig. 1, employ a pulverulent to granular initial material 6, e. g. crushed titanium or zirconium sponge which after being produced in a known manner by the reduction of titanium tetrachloride or zirconium tetrachloride, may be kept in storage in sufficient quantity in a storage reservoir 4 provided at its top with an opening 5, and be continuously or in a dosed manner transferred into the pressure chamber 1a through the dosing device 7 and the chute 8. The pressure chamber 1a is arranged at the upper end of the vertical electrode-transfer tube 10. By means of a suitably arranged press 1, for example of an eccentric press having a driving motor 2 and a press plunger 3, the metal powder supplied is compressed to form the electrode. Since the press may make a great number of working strokes per minute, for example 40 to 70 strokes per minute, the upper end 9a of the electrode will be lengthened in a fairly continuous manner according to the quantity of metal supplied. At the same time the press plunger also effects the progressive advance of the electrode 9. The transfer tube is, according to the invention, subdivided into a number of sections, of which according to a feature of the invention the sections 10a, 10b and 10c are widened to form pressure-stage chambers, while the remaining sections 10e and 10d and the parts disposed between the pressure-stage chambers for with their internal diameter the electrode formed with as little play as possible. The pressure-stage chamber 10a is evacuated by means of a prevacuum pump 24 shown schematically, while the pressure-stage chambers 10b and 10c are equipped with pump sets which in addition to the prevacuum pumps 25b and 26c also comprise the Roots pumps 25a or in two stage arrangement 26a and 26b which are specially adapted for high-vacuum operation and which are particularly effective as intermediate pumps below 20 mm. It may be advantageous to supply in one of the pressure-stage chambers, for example the middle one, an inert protective gas. For this purpose a gas cylinder 23 which is filled, for example, with argon is connected to the said chamber. The instruments 23a and 23b serve for reading the pressure. The instrument 23b is a pressure-reducing valve. The flow velocity is red on the instrument 23c.

Finally the apparatus also comprises a high-vacuum chamber 11, which is evacuated through the communication passage 29 by means of a diffusion pump 27 and a mechanical prevacuum pump 28 connected in series with it. 30 is the actuating mechanism for the valve of the diffusion pump. Inside the high-vacuum chamber 11 the forwardly moving electrode element 9c is subjected to particularly intense degasification, so that in the arc chamber 12 only unimportant quantities of gas will escape from the heated electrode end piece which consumes itself by being melted off. The melted off metal is collected in the metal melt 13 and is supported by the lowering device 14 which forms the counter electrode. The drive for the raising and lowering of the counter electrode 14 is transmitted from a motor 16 by a bevel gear connection 15a and 15b. The current connections are provided at the upper end of the transfer tube 10 at 22a, and at the lower end of the housing 17, at 22b. 22c is a cable arranged inside the housing.

Since, in addition to the electrode being heated direct by the arc current flowing through it the arc will also transmit very much heat to the whole of the device by heat radiation and heat conduction, care must be taken for intensive cooling. The arc chamber 12 is cooled by a flowing cooling medium which is supplied at 19a and flows off at 19b. Water cooling is sufficient. The high-vacuum chamber is also provided with cooling means for its surface. The cooling medium is introduced at 20a or 21a and flows off at 20b or 21b. The counter-electrode is likewise cooled from below, the cooling medium being supplied through 18a and flowing off through 18b, in order to speed the solidification of the metal block 13. In the compression chamber 1a and in the supply receptacle 4 atmospheric pressure may prevail, because it is possible without difficulty to transfer the electrode through the pressure-stage stretch in which at least one evacuated intermediate chamber is arranged, into the chamber 11 which is under high vacuum. While an electric arc cannot burn in a high vacuum, the small amount of gases which are still liberated although preliminary degasification takes place in the pressure-stage stretch and more particularly in the chamber 11, and the vapour pressure of the metals to be melted as well as minor metallic impurities in the arc zone, provide the pressure required for the maintenance of the arc.

While in principle the electrodes may build up according to any desired process, pulverulent to granular material obtained from metal sponge being preferably employed. Progressive building up of the electrode by pressing dosed metal quantities to the end 9a of the electrode is particularly advantageous. The press in this case produces at the same time the feed movement of the electrode. The usual type of rod extrusion devices, eccentric presses, and like mechanical pressing devices may be used, which should exercise a pressure of 2000 to 10,000 kilograms per square centimetre, preferably a pressure of 2000 to 7000 kilograms per square centimetre. When using three pressure-stage chambers in addition to the high-vacuum chamber 11, it is found that it is permissible for a play of up to 0.1 mm. to be present between the electrodes 9, which preferably have a diameter of 30 to 70 mm., and the inner wall of the transfer tube 10, without appreciable quantities of gas flowing over into the high vacuum and arc zone. For if powerful pumps are employed for the evacuation of the pressure-stage chambers, the flowing-in quantities of gas are withdrawn entirely, and a pressure decreasing in stages can be maintained. It is more particularly advisable to employ in the pump sets high vacuum pumps 25a working on the Roots principle, or two-stage Roots pumps 26a and 26b, which may be combined with conventional prevacuum pumps. In this case a pressure down to $10^{-4}$ mm. Hg may be produced in the high-vacuum chamber 11.

The electrodes pressed from metal sponge or metal powder are sufficiently air-tight, provided their length is sufficient, to seal the pressure-stage stretch.

In order to reduce still further the concentration of the noxious gases, viz: nitrogen and oxygen, in the arc zone, it is advisable to supply in a pressure-stretch stage chamber, preferably in the central pressure-stage chamber, an inert gas, for example a noble gas such as argon, and this preferably in dosed quantities, by measuring the supplied quantity by means of a flow meter and a pressure-reducing valve. Small quantities of protective gas are sufficient since the pressure in this pressure-stage chamber should lie approximately between $10^{-3}$ and $10^{-1}$ mm.

It is advisable to effect the shaping of the electrode under a low pressure or at least in an inert gas. The supply receptacle may also be kept under a pressure lower than atmospheric pressure by a pump 4a, so that the material 6 can be introduced through simple lock devices. The preliminary degasification is also assisted by mere heating during the compression operation or by heating of the material in the receptacle 4.

The pressing speed and the melting-off speed as well as the arc current and the arc voltage must be matched with each other in such maner as to ensure that exactly the same quantities of metal are fused off as are compressed at the top; this can be effected by controlling the electric current with the help of the arc voltage, which depends upon the length of the arc.

The arrangement shown by way of example in Fig. 1, in which an eccentric press carrying out a very great number of working strokes, for example 60 working strokes per minute, can be ideally employed for the production of alloys, because only relatively small quantities are pressed on to the electrode 9 at each working stroke. During the arc melting of alloys the main difficulty consists in obtaining a homogeneous composition throughout the smelted block. Now if from a plurality of supply receptacles continually small but accurately measured quantities of the various constituents of the alloy are supplied, the electrode is alternatively built up of small pieces of the various constituents and as a result of the fusing off a fairly uniform mixture will be obtained in the smelted block 13. Automatic dosing machines which are available in the trade are preferably employed for feeding the basic metal and the alloy constituents.

Fig. 2 illustrates an arc installation according to the invention, in which the electrode is built up by welding from electrode part pieces 31a which have been prefabricated by any method. The electrode part pieces 31a are moved from the receptacle 31 into the welding chamber 32, where each part piece 31b is intercepted by guide sleeves 35a and 35b and placed on to the end 31c of the already welded electrode. The welding-on is then effected periodically at the welding electrodes 34a and 34b. In the welding chamber 32 a reduced pressure should be maintained by connecting any known suitable pump set to the flange 33. Preferably the welding is moreover effected in a protective gas atmosphere, the protective gas being supplied through the conduit 35, which is provided with a reducing valve, from a gas cylinder 40.

The welding chamber 32 forms a first pressure-stage chamber. In addition a second pressure-stage chamber is provided in which a low gas pressure is maintained by means of a pump set comprising the Roots pump 39a and the prevacuum pump 39b. In this case, too, the partial pressure of noxious gases may be still further reduced by supplying a protective gas to the chamber 38. The welded-together electrode then still passes through the high-vacuum chamber 41 in order to be there completely degasified.

In the construction according to Fig. 2, the feed movement for the electrode is supplied by forming the current connections 42a for this welding current and for the arc current as suitably driven rotatable rollers which are applied closely with adequate pressure to the electrode element 31b and move the same downwardly. Guide rollers 44 may be provided in addition.

The other polarity of the arc current is supplied at the lower end of the lowering device at 42b, as in the case of Fig. 1. The other elements are constructed similarly as in Fig. 1. Direct current of 2000 to 8000 amps. may be employed in the apparatus with a voltage which should be determined in accordance with the protective gas employed. In the case of argon the voltage may be 10 to 25 volts, in the case of helium as protective gas up to 45 volts, and in the case of high vacuum up to 20 volts.

The individual electrode elements 31a may be introduced from the outside through lock-like devices into the chamber 31 in which a reduced pressure may likewise be maintained.

The degasification, more particularly in the high-vacuum chamber 11 of Fig. 1 or in the chamber 41 of Fig. 2, is further assisted by additionally heating the part-length of the electrode 9c or 31a by high frequency coils 9e or by the direct passage of current, unless the arc current or the welding current, which in each case passes through the electrode, already produces the same effect. The outgoing gases are withdrawn in the pressure-stage chambers or in the high-vacuum chamber.

The method according to the invention may be further supplemented by arranging for additional starting material in unbound or loose form, that is to say powdery to granular, to be supplied in the melting zone of the arc chamber 12 or 43. The conveying devices for this being constructed similarly to those of known arc-melting furnaces. In this manner the fusing-off speed may be reduced, but care must be taken that any metal additionally introduced into the arc zone is previously well degasified in order to avoid the formation of cavities in the smelted metal.

The surprisingly great improvement of the qualities shown by metal bars smelted according to the invention shows how important is the prevention of gas access to the decisive phases of the melting process. While when melting, for example, titanium sponge, one is able to obtain with the usual type of preliminary degasification outside the arc furnace a metal having a hardness of 180 kg./sq. mm. according to the Vickers scale, a Vickers hardness of only 150 to 160 kg./sq. mm. results when metal sponge of the same kind is, according to the present invention, preliminarily degasified before the melting and then melted. This reduction of the hardness increases the ductility of the titanium to an extent which is decisive for its practical use.

We claim:

1. In an arc melting furnace in which a consumable electrode is melted by an electric arc, the combination which comprises a vacuum-tight crucible for holding metal melted from the consumable electrode, a second electrode in the crucible, means for passing current between the two electrodes, a transfer tube surrounding the consumable electrode and connected to the crucible to extend away from it, means for moving the consumable electrode through the transfer tube and into the crucible, means for evacuating the transfer tube at spaced intervals to subject the consumable electrode to decreasing pressure as it is moved toward the crucible, and means for evacuating the crucible to a pressure lower than the lowest pressure in the transfer tube.

2. In an arc melting furnace in which a consumable electrode is melted by an electric arc, the combination which comprises a vacuum-tight crucible for holding metal melted from the consumable electrode, a second electrode in the crucible, means for passing current between the two electrodes, an elongated transfer tube connected to the crucible and extending away from it, means for forming a cohesive, continuous consumable electrode from a pulverulent to granular metal material at the end of the tube remote from the crucible, means for moving the consumable electrode through the transfer tube and into the crucible, means for evacuating the transfer tube at spaced intervals to subject the consumable electrode to decreasing pressure as it is moved toward the crucible, and means for evacuating the crucible to a pressure lower than the lowest pressure in the transfer tube.

3. Apparatus according to claim 2 which includes means for degassing the metal material as it is formed into the consumable electrode.

4. In an arc melting furnace in which a consumable electrode is melted by an electric arc, the combination which comprises a vacuum-tight crucible for holding metal melted from the consumable electrode, a second electrode in the crucible, means for passing current between the two electrodes, a transfer tube surrounding the consumable electrode and connected to the crucible to extend away from it, means for moving the consumable electrode through the transfer tube and into the crucible, heating means in the crucible independent of the arc-melting current for heating the electrode, means for evacuating the transfer tube at spaced intervals to subject the consumable electrode to decreasing pressure as it is moved toward the crucible, and means for evacuating the crucible to a pressure lower than the lowest pressure in the transfer tube.

References Cited in the file of this patent

UNITED STATES PATENTS

| | | |
|---|---|---|
| 2,097,502 | Southgate | Nov. 2, 1937 |
| 2,541,764 | Herres et al. | Feb. 13, 1951 |
| 2,640,860 | Herres | June 2, 1953 |
| 2,697,126 | Herres | Dec. 14, 1954 |
| 2,686,822 | Evans et al. | Aug. 17, 1954 |

OTHER REFERENCES

"Report of Symposium on Titanium," published by Office of Naval Research, Dec. 1948, pages 81–83.